United States Patent
Yang et al.

(10) Patent No.: US 8,233,694 B2
(45) Date of Patent: Jul. 31, 2012

(54) METHOD OF APPEARANCE DEFORMATION INDEXING

(75) Inventors: Wuhua Yang, Ann Arbor, MI (US);
Robert Bruce Tilove, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 468 days.

(21) Appl. No.: 12/582,730

(22) Filed: Oct. 21, 2009

(65) Prior Publication Data

US 2011/0091093 A1 Apr. 21, 2011

(51) Int. Cl.
*G06K 9/00* (2006.01)
(52) U.S. Cl. ......................... 382/141; 382/152
(58) Field of Classification Search .................. 382/141, 382/152
See application file for complete search history.

(56) References Cited

U.S. PATENT DOCUMENTS

| | | | |
|---|---|---|---|
| 5,367,378 A | 11/1994 | Harding et al. | |
| 5,726,705 A | 3/1998 | Imanishi et al. | |
| 6,266,138 B1 | 7/2001 | Keshavmurthy | |
| 6,320,654 B1 | 11/2001 | Alders et al. | |
| 7,088,442 B2 | 8/2006 | Hassler et al. | |
| 7,372,558 B2 | 5/2008 | Kaufman et al. | |
| 7,672,485 B2 * | 3/2010 | Chambard et al. | 382/108 |

FOREIGN PATENT DOCUMENTS

| | | |
|---|---|---|
| JP | 6201607 A | 7/1994 |
| WO | 2004063732 A1 | 7/2004 |
| WO | 2005090907 A1 | 9/2005 |

* cited by examiner

*Primary Examiner* — Roy M Punnoose
(74) *Attorney, Agent, or Firm* — Quinn Law Group, PLLC

(57) ABSTRACT

A method to detect and rank appearance distortions includes creating virtual models of a reference panel and a processed panel, including a first reference patch and the processed panel, respectively. Projecting a first simulated light pattern on the reference panel and the processed panel, and viewing the first reference patch and the first processed patch from a first viewpoint with respect to the first simulated light pattern. The method compares a first reference reflection at the first reference patch with a first processed reflection at the first processed patch, and creates a first index value from optical variations between the appearance of the reference and processed reflections. The first index value is output in a computer readable format. The method may compare the first index value to a predetermined index value and determine whether the processed panel is within an acceptable appearance quality threshold.

16 Claims, 4 Drawing Sheets

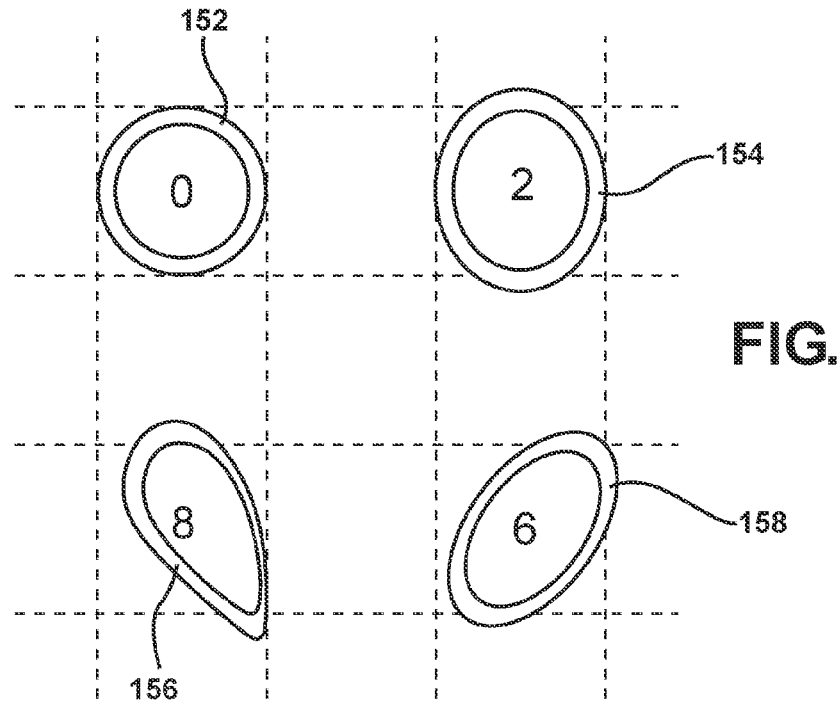
FIG. 3A
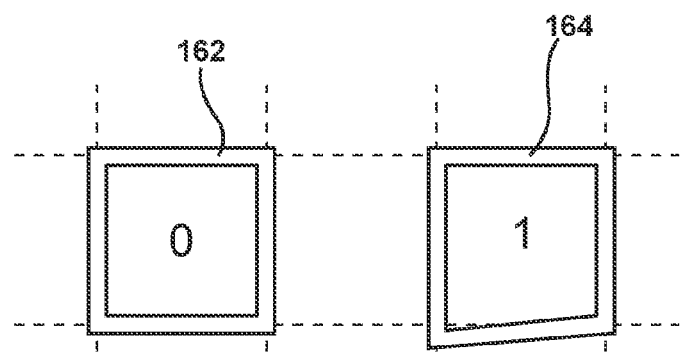
FIG. 3B
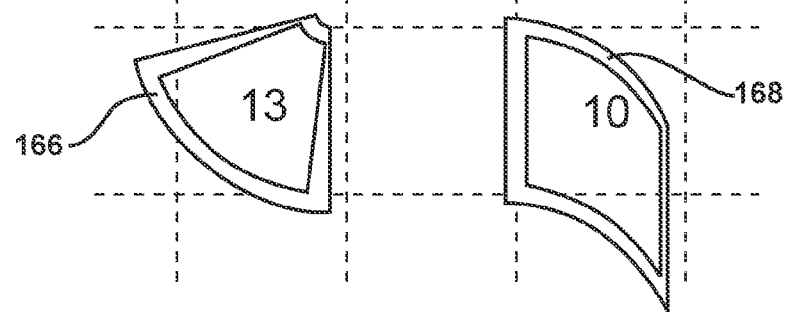

METHOD OF APPEARANCE DEFORMATION INDEXING

TECHNICAL FIELD

This disclosure relates to a method of identifying defects in panels.

BACKGROUND OF THE INVENTION

In the process of manufacturing a part, such as a stamped sheet metal panel where it is important that the surface be precisely shaped, it may be beneficial to verify and, if necessary, to accurately correct (rework) the design of the surface or of the manufacturing process. To verify the part, the surface shape is compared with design specifications. These comparisons may be made by technicians who view the parts in "green rooms," areas of controlled lighting, in order to discover defects or distortions in the appearance of the part. The technicians are grading the parts subjectively, according to individual experience and individual measures of acceptable variations in appearance.

SUMMARY

A method to detect and rank appearance distortions includes creating a virtual model of a reference panel and creating a virtual model of a processed panel. The reference panel includes a first reference patch and the processed panel includes a first processed patch. The method includes projecting a first simulated light pattern on the reference panel and the processed panel, and viewing the first reference patch and the first processed patch from a first viewpoint with respect to the first simulated light pattern.

The method compares a first reference reflection at the first reference patch with a first processed reflection at the first processed patch, and creates a first index value from optical variations between the appearance of the first reference reflection and the first processed reflection. The first index value is output in a computer readable format. The method may further include comparing the first index value to a predetermined index value and determining whether the processed panel is within an acceptable appearance quality threshold from the comparison.

A second simulated light pattern, which is different from the first simulated light pattern, may be projected on the reference panel and the processed panel. The first reference patch and the first processed patch may be viewed from a second viewpoint, different from the first viewpoint, with respect to either or both of the first simulated light pattern and the second simulated light pattern.

The above features and advantages and other features and advantages of the present invention are readily apparent from the following detailed description of the best modes and other embodiments for carrying out the invention when taken in connection with the accompanying drawings.

BRIEF DESCRIPTION OF THE DRAWINGS

FIGS. 3A-B are schematic depictions of representative appearance patches or regions, along with illustrative index values, FIG. 3A showing reflections from a circular light pattern and FIG. 3B showing reflections from a rectangular light pattern.

DESCRIPTION OF PREFERRED EMBODIMENTS

Figure 1A:
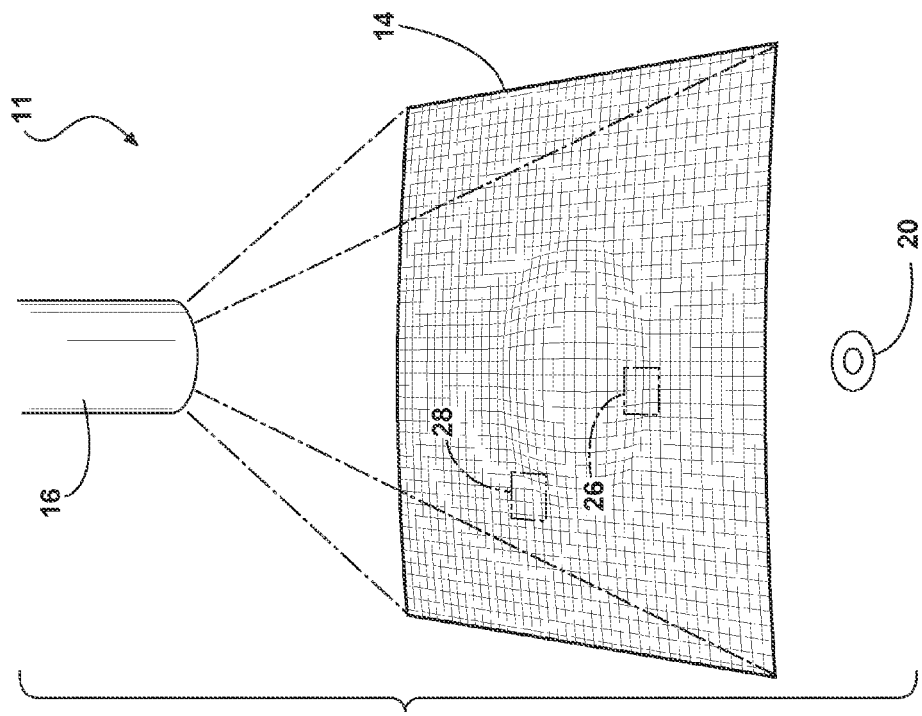
FIGS. 1A-B are schematic depictions of virtual workspaces for utilizing a method of appearance deformation indexing, FIG. 1A having a reference panel and FIG. 1B having a processed panel.
Figure 1B:
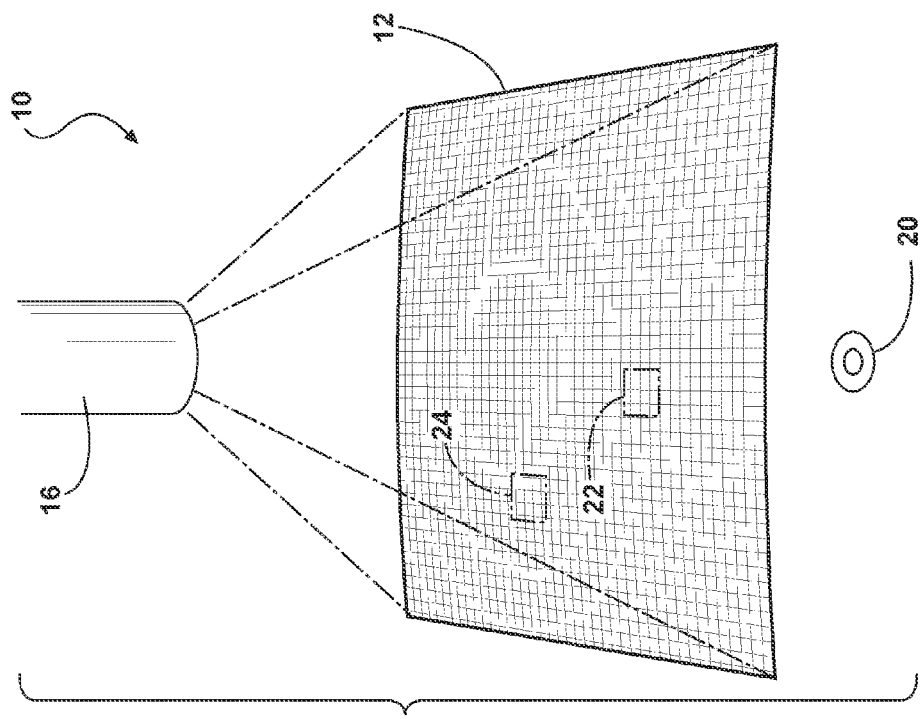

Referring to the drawings, wherein like reference numbers correspond to like or similar components throughout the several figures, there are shown in FIG. 1A and FIG. 1B two virtual workspaces 10 and 11, respectively, which may be used to execute a method of appearance deformation indexing. The workspaces 10, 11 are created within one or more distributed or unitary host machines, processors, or computers. The method may be used to detect and rank surface-appearance defects on vehicle body panels produced by various processes, such as, without limitation, stamping. The method detects differences in surface appearances under simulated lighting conditions and ranks those appearance differences to allow quantitative analysis of the body panel.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Two virtual models of body panels are created in the workspaces 10, 11. In FIG. 1A is a reference panel 12, which is created in the workspace 10. A processed panel 14 is shown in FIG. 1B, in workspace 11. Those having ordinary skill in the art will recognize that while the reference panel 12 and processed panel 14, and also the workspaces 10, 11, are shown juxtaposed for illustrative purposes only, the two may be created in separate computing devices, at separate times by the same computing device, or coincidentally in the same devices. Furthermore, the workspaces 10, 11 may be shown on one or more visual display devices.

The reference panel 12 is an ideal, target, or goal body panel produced from a beginning workpiece or blank (not shown). The reference panel 12 therefore may represent the ideal panel which the vehicle designers and engineers seek to produce for the eventual vehicle. The processed panel 14 is the result of the blank having undergone one or more real or simulated manufacturing processes. For example, the processed panel 14 may be the result of one or more stamping, bending, or other procedures which may eventually be used to manufacture the final, production body panel for the actual vehicle.

The virtual model of the reference panel 12 may be created by importing data from one or more of several virtual sources, including, without limitation: a CAD surface or a finite element analysis (FEA) mesh. Furthermore, the virtual model of the reference panel 12 may be created by importing data from one or more sources, including, without limitation: a surface scan of a die surface which will be used to stamp the body panel, of a surface scan of a clay model used in designing the body panel.

The virtual model of the processed panel 14 may be created by importing data from one or more of several sources, including, without limitation: an FEA mesh following simulation of a manufacturing process or processes on the blank, or a surface scan of an actual, manufactured panel created by the manufacturing process or processes. Therefore, the processed panel 14 may be used to determine whether or not the planned manufacturing process will yield a final, production body panel which is visually suitable for the vehicle.

This method detects differences in the appearances of the surface under simulated lighting conditions. These differences are visual defects that would affect the look of the body panel, but may not be dimensionally significant. Therefore, the method may be able to identify visual defects even where a dimensional analysis would consider the body panel to be perfect, or at least within acceptable ranges of dimensional variance.

The method detects appearance defects creating a quantitative index from differences between distortion of shapes and patterns on an ideal body panel and a manufactured body panel. To do this, the method looks at the reflections of light patterns and shapes on the ideal and manufactured panels, and does so in the virtual, or computer-based, workspaces 10, 11.

A first simulated light pattern 16 is projected onto both the reference panel 12 and the processed panel 14. A viewpoint 20 is established within both workspaces 10, 11. The first simulated light pattern 16 and viewpoint 20 shown are illustrative only. Those having ordinary skill in the art will recognize that the first simulated light pattern 16 may be a wall or plane of lights, a group of point or bar lights, or other virtual structure configured to project a lighting pattern (as discussed below) onto the reference and processed panels 12, 14.

The viewpoint 20 is located at the same point in space relative to the first simulated light pattern 16 and the reference and processed panels 12, 14, in both of the workspaces 10, 11. Therefore, the relative positions of the first simulated light patterns 16, viewpoints 20, and respective reference and processed panels 12, 14 are substantially identical in both the workspace 10 and workspace 11.

The reference panel 12 includes a first reference patch 22 and second reference patch 24. Similarly, the processed panel 14 includes a first processed patch 26 and a second processed patch 28. These patches are individual regions or areas of interest, and may be located in individual strategic positions. Alternatively, the whole surface—or at least the whole class-A side of the panel—may be covered with patches. Furthermore, the size of the individual patches may be varied, depending upon the size and shape of the reference and processed panels 12, 14.

The patches provide specific areas in which reflections from the first simulated light pattern 16 may be viewed from the viewpoint 20. Because the patches have the same relative location on the reference and processed panels 12, 14, comparison between the reflections may be used to determine the amount of appearance distortion between the reference and processed panels 12, 14 at a respective patch location.

The method views the first reference patch 22 and the first processed patch 26 from the viewpoint 20 with respect to the first simulated light pattern 16, and thereby captures a first reference reflection and a first processed reflection. The method also views the second reference patch 24 and the second processed patch 28 from the viewpoint 20 with respect to the first simulated light pattern 16, and thereby captures a second reference reflection and a second processed reflection.

Referring now to FIGS. 2A-2D, and with continued reference to FIGS. 1A-B, there are shown schematic depictions of four different lighting patterns usable with the method of appearance deformation indexing. Each of the lighting patterns shown may be used as the first simulated light pattern 16. Because the method is comparing the visual appearance of the first and second reference patches 22, 24 to the first and second processed patches 26, 28, changing the lighting patterns may assist in identifying areas of the processed panel 14 which contain visual defects.

Figure 2A:
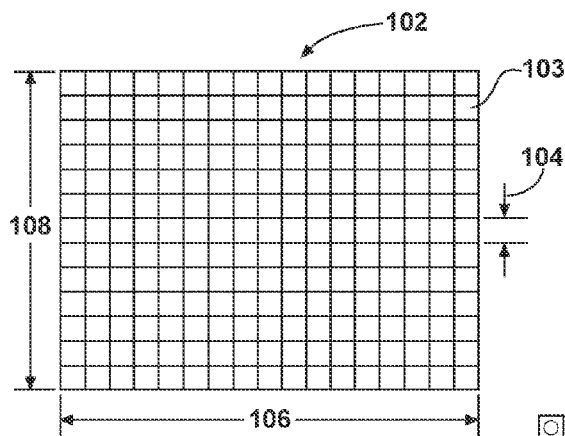
FIGS. 2A-D are schematic depictions of four lighting patterns usable with the method of appearance deformation indexing, FIG. 2A having square lighting elements, FIG. 2B having round lighting elements, FIG. 2C having square lighting elements arranged in a checkerboard pattern, and FIG. 2D having ring-shaped lighting elements on a bar-light grid.

FIG. 2A, a first pattern 102 has square lighting elements 103 having a width and height shown by dimension 104. The square lighting elements 103 are repeated across the whole width 106 and height 108 of the first pattern 102.

Figure 2B:
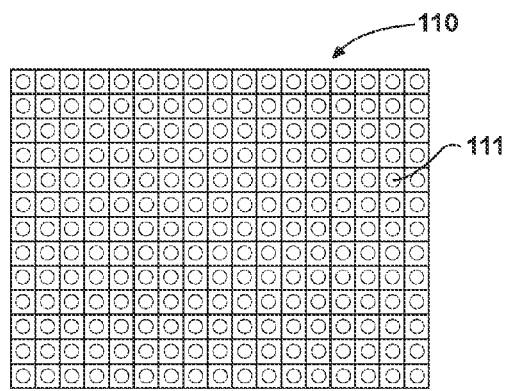

In FIG. 2B, a second pattern 110 has round lighting elements 111. The round lighting elements are arranged in a grid and spaced apart. The round lighting elements 111 may be further combined with a grid of bar lights, shown as horizontal and vertical lines in FIG. 2B. Those having ordinary skill in the art will recognize that any of the lighting patterns used may be generated with different types and spectra of light. For example, and without limitation, the round lighting elements 111 may be red lights and the grid elements may be white lights, or the reverse.

Figure 2C:
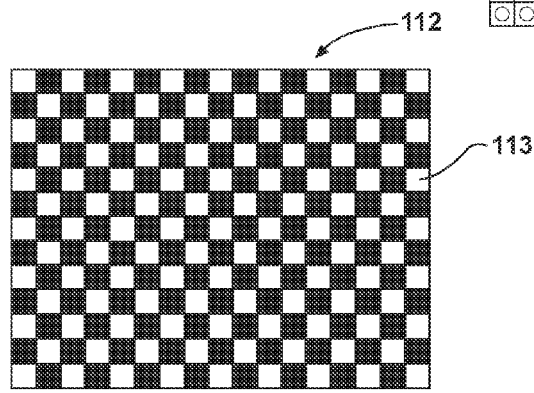

In FIG. 2C, a third pattern 112 has square lighting elements 113. However, in the third pattern 112, the square lighting elements 113 are arranged in an alternating grid or checkerboard pattern. This checkerboard pattern may provide more separation between individual square lighting elements 113 than the square lighting pattern 102 shown in FIG. 2A.

Figure 2D:
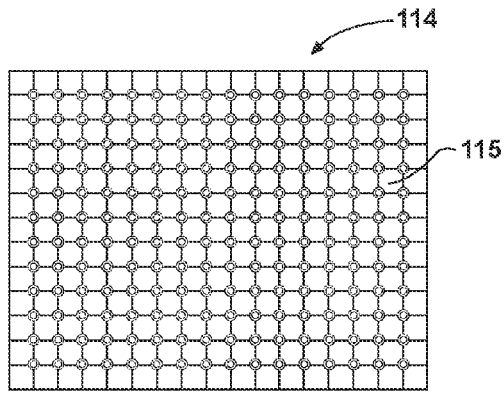

In FIG. 2D, a fourth pattern 114 has ring-shaped lighting elements 115. The ring-shaped lighting elements 115 may provide additional contrast between adjacent elements. The ring-shaped lighting elements 115 are also shown on a grid and may be combined with a grid of bar lights. Those having ordinary skill in the art will recognize that additional shapes of lighting elements may be utilized to determine the appearance distortion between the reference and processed panels 12, 14. Those having ordinary skill in the art will further recognize that combinations of the lighting elements and lighting patterns may be utilized. For example, and without limitation, the round lighting elements 111 and square lighting elements 103 may be combined in an alternating, or checkerboard, pattern.

The method compares the appearance of the first reference reflection at the first reference patch 22 with the appearance of the first processed reflection at the first processed patch 26. Any relative distortion between the appearance of the reflections is indicative of some type of visual defect occurring at the first processed patch 26.

If the first reference patch 22 is located on a curvature, note that the first reference reflection will purposefully have some visual deformation from the exact shape of the lighting element reflected thereon. Similarly, a deformation effect may also occur due to the viewing angle between the viewpoint 20 and first simulated light pattern 16. This deformation will not be indicative of a visual defect unless the first processed reflection viewed on the first processed patch 26 has a different shape or amount of visual deformation. By comparing the relative visual deformation between the first reference patch 22 and the first processed patch 26, the method is able to determine whether or not the processed panel 14 includes a visual defect at that location.

The method may also compare the appearance of the second reference reflection at the second reference patch 24 with the second processed reflection at the second processed patch 28. With a similar comparison, the relative visual deformation between the reflections on the second reference patch 24 and the second processed patch 28, the method is able to determine whether or not there is a visual defect on the processed panel 14 at the second processed patch 28.

Referring now to FIGS. 3A and 3B, and with continued reference to FIGS. 1A-B and 2A-D, there are shown exemplary depictions of appearance patches reflected from the first simulated light patterns 16, along with illustrative index values from the relative appearance distortions. FIG. 3A shows reflections from lighting elements having a hollow circular shape and FIG. 3B shows reflections from lighting elements having a hollow square shape.

The reflections shown may be the first or second processed reflections occurring on the first or second processed patches 26, 28. Those having ordinary skill in the art will recognize that the first or second processed patches 26, 28 may be defined to include reflections of more than one lighting element or may be defined to include only a portion of one individual lighting element, and that the individual elements or collective views shown in FIGS. 3A and 3B are not limiting.

The method creates a first index value from optical variations between the appearance of the first reference reflection and the first processed reflection. As shown in FIG. 3A, a reflection 152 has been assigned a first index value of 0. This may be indicative of, for example, the reflection 152 on the first processed patch 26 having no relative appearance deformation when compared to the reflection on the first reference patch 22. The method creates the index by analyzing the appearance of the shapes and patterns within the first and second processed patches 26, 28 and the first and second reference patches 22, 24.

Those having ordinary skill in the art will recognize that neither the individual nor relative index values shown in FIGS. 3A and 3B are not limiting and that other indexing systems may be used. For example, the indexing system may have both positive and negative numbers depending upon the type of appearance distortion, or the magnitudes of the index values may vary far more greatly than the illustrative values shown in FIGS. 3A and 3B.

For illustrative purpose, it may be assumed that the first reference reflection looks substantially equivalent to the reflection 152. Therefore, the reflection 154 shows a small amount of relative deformation because it is stretched vertically. As further shown in FIG. 3A, a reflection 154 has been compared to the ideal reflection and the method has assigned a second index value of 2. This may be indicative of, for example, the reflection 154 on the first processed patch 26 having only a slight relative appearance deformation when compared to the reflection on the first reference patch 22.

The method further includes outputting the first index value (in this example: 0) and the second index value (in this example: 2) in a computer readable format. The computer readable format may be a display or screen, a computer, a printable log, and a storage medium. Outputting to the computer readable medium allows further processing of the calculated index values.

The method may then compare the first index value and the second index value to a predetermined index value, and determine whether the processed panel 14 is within an acceptable appearance quality threshold from the comparison of the first and second index values to the predetermined index value. Depending upon the specific needs of the manufacturing, the resulting first and second index values may be either acceptable or unacceptable. In the example about (using index values of 0 and 2) the first index value would be acceptable because there is no relative deformation. The second index value may still be acceptable, because the method may be designed to allow small variations from the ideal, and an index value equal to 2 may be an acceptable variation.

Referring to the additional reflections shown in FIG. 3A, a reflection 156 has an index value of 8, and a reflection 158 has an index value of 6. These relative index values would suggest that the method has determined that the reflection 158 has less appearance distortion than the reflection 156 when compared to the reference reflection. It is likely that both the reflection 156 and reflection 158 would cause the processed panel 14 to be rejected based upon the amount of relative appearance distortions from the reference panel 12.

By comparing the index values to a predetermined threshold, the method is able to quantitatively—as opposed to qualitatively—identify visual defects in the processed panel 14 by identifying excessive distortions in the appearance of the first and second processed patches 26, 28 relative to the ideal appearance of the first and second reference patches 22, 24. Furthermore, the method quantitatively identifies the visual defects with measuring or generating a dimensional variance between the reference panel 12 and the processed panel 14. Dimensional variances in panel may be small—and thus seem not to be defects—even though the visual appearance of the variances may be very different from the ideal body panel.

FIG. 3B shows similar reflections from lighting elements having a hollow square shape. A reflection 162 has been assigned an index value of 0, indicating that the reflection 162 is substantially identical to the reflection on reference panel 12.

Three less-than-ideal reflections are also shown in FIG. 3B, and the method has created index values representing their respective appearance deviations. A reflection 164 has an index value of 1, indicating only a slight visual defect. However, a reflection 166 has an index value of 13 and a reflection 168 has an index value of 10, indicating that these two reflections show greater visual deviation from the ideal reference patch.

In order to further the ability of the method to identify visual defects, the method may include changing to a second simulated light pattern (not shown). The second simulated light pattern is then projected on the reference panel 12 and the processed panel 14 where it may be viewed from the viewpoint 20. The second simulated light pattern is different from the first simulated light pattern 16, and therefore casts different reflections on the reference and processed panels 12, 14. New index values may then be created based upon the second simulated light pattern.

Furthermore, the method may include viewing the first reference patch 22 and the first processed patch 26 from a second viewpoint (not shown), which is different from the viewpoint 20. The second viewpoint may be used to change the reflections on the first and second reference patches 22, 24 and the first and second processed patches 26, 28. The second viewpoint may be used in conjunction with either the first simulated light pattern 16 or the second simulated light pattern.

Figure 4:
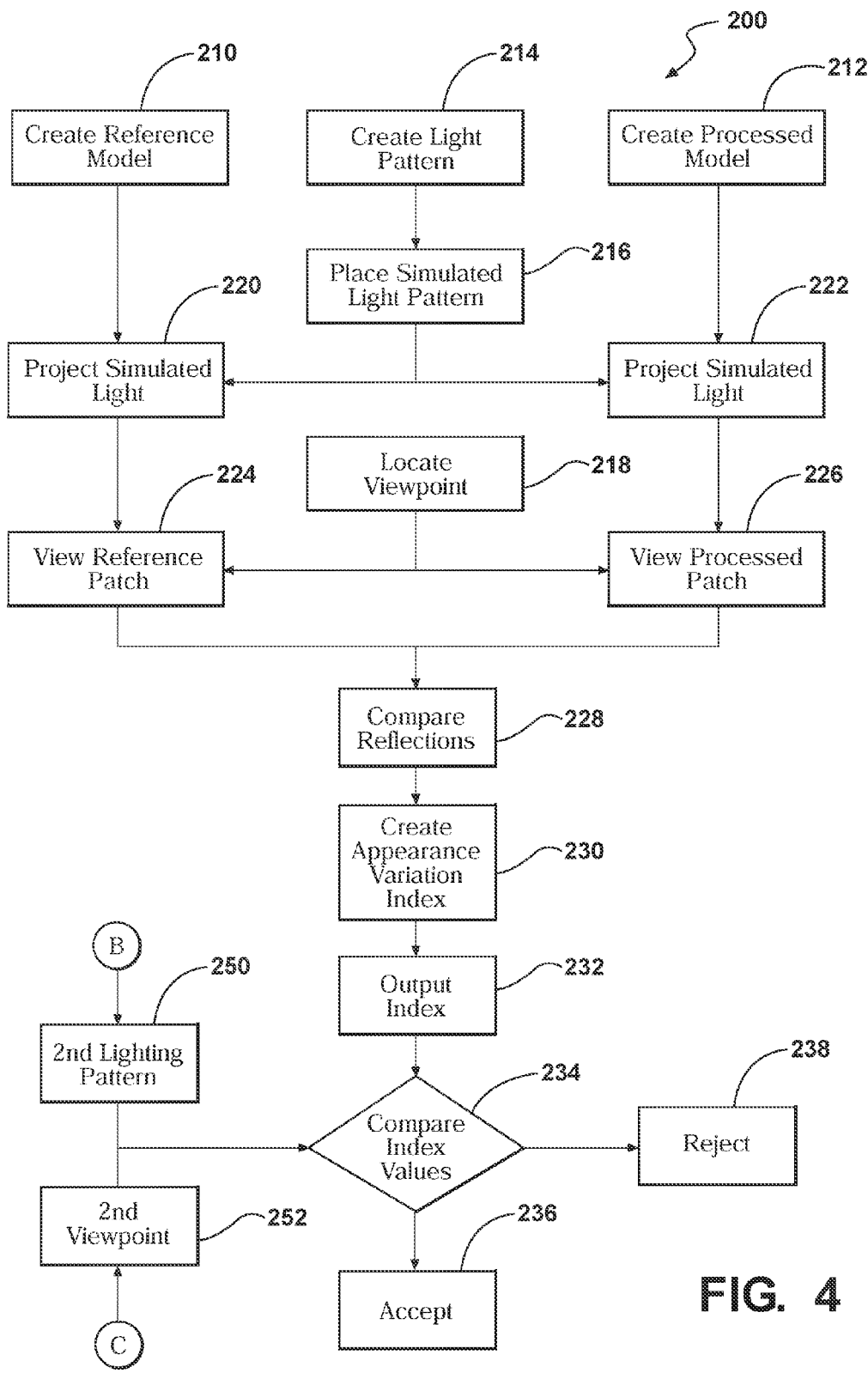
FIG. 4 is a schematic flow chart illustrating an algorithm for executing the method of appearance deformation indexing.

Referring now to FIG. 4, and with continued reference to FIGS. 1-3, there is shown an algorithm 200 which may be used to execute all or portions of the method of appearance deformation indexing described herein. Algorithm 200 may be executed within one or more distributed or unitary host machines, processors, or computers.

For illustrative purposes, the algorithm 200 may be described with reference to the elements shown and described in relation to FIGS. 1-3. However, those having ordinary skill in the art will recognize other elements which may be used to practice the algorithm 200 and the invention as defined in the appended claims. Those having ordinary skill will further recognize that the exact order of the steps of the algorithm 200 shown in FIG. 4 is not required, and that steps may be reordered, steps may be omitted, and additional steps may be included.

The algorithm 200 may begin with any one of three steps. In steps 210 and 212, the virtual models of the reference panel 12 and processed panel 14 are created. In step 214, the first simulated light pattern 16 is created. Step 214 may occur before, after, or concurrently with either or both of steps 210 and 212. In step 216, the first simulated light pattern 16 is located or placed relative to the reference and processed panels 12, 14. In step 218, the algorithm 200 also locates the viewpoint 20 relative to the reference and processed panels 12, 14.

Steps 220 and 222 include projecting or casting the simulated light pattern 16 onto the reference panel 12 and the processed panel 14, which creates reflections on the first reference patch 22 and the first processed patch 26. In steps 224 and 226, the algorithm 200 views the first reference reflection and the first processed reflection from the viewpoint 20.

The algorithm 200 then compares the appearance of the reflections in step 228, in order to determine the appearance distortion of the first processed reflection relative to the first reference reflection. In step 230, the algorithm 200 creates the appearance distortion index. Using the previously-discussed example, if the first reference reflection has the appearance of reflection 162 in FIG. 3B and the first processed reflection has the appearance of reflection 168 in FIG. 3B; step 230 results in an appearance distortion index value of 10. Step 232 outputs the index in a computer readable format.

In step 234, the algorithm 200 compares the index value with the predetermined index value in order to determine acceptability of the processed panel 14. If the index value is within the acceptable range—by being, for example, below the predetermined value—then the algorithm 200 proceeds to step 236 and the processed panel 14, or at least the first processed patch 26, is accepted. However, if the index value is not acceptable, as was the case for the reflection 168 having an index value of 10, then the algorithm proceeds to step 238 and the processed panel 14 is rejected.

The algorithm 200 may further include additional steps, such as those represented schematically by paths B and C. Path B includes many or all of the steps leading up to comparing the index value in step 234. However, path B further includes creating and using the second simulated lighting pattern, which is shown schematically at step 250. Similarly, path C includes viewing and analyzing the panels from the second viewpoint, which is shown schematically at step 250. Path C may also include many or all of the steps leading up to comparing the index value in step 234.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method to detect and rank appearance distortions, comprising:
    creating a virtual model of a reference panel, wherein the reference panel includes a first reference patch;
    creating a virtual model of a processed panel, wherein the processed panel includes a first processed patch;
    projecting a first simulated light pattern on the reference panel and the processed panel;
    viewing the first reference patch and the first processed patch from a first viewpoint with respect to the first simulated light pattern;
    comparing a first reference reflection at the first reference patch with a first processed reflection at the first processed patch;
    creating a first index value from optical variations between the first reference reflection and the first processed reflection; and
    outputting the first index value in a computer readable format.

2. The method of claim 1, further comprising:
    comparing the first index value to a predetermined index value; and
    determining whether the processed panel is within an acceptable appearance quality threshold from the comparison of the first index value to the predetermined index value.

3. The method of claim 2, further including projecting a second simulated light pattern on the reference panel and the processed panel, wherein the second simulated light pattern is different from the first simulated light pattern.

4. The method of claim 3, further including viewing the first reference patch and the first processed patch from a second viewpoint with respect to the first simulated light pattern, wherein the second viewpoint is different from the first viewpoint.

5. The method of claim 4, further characterized by a lack of generating a dimensional variance between the reference panel and the processed panel.

6. The method of claim 5, wherein the creating the virtual model of the reference panel includes importing one of a CAD surface, an FEA mesh, a surface scan of a die surface, and a surface scan of a clay model.

7. The method of claim 6, wherein the creating the virtual model of the processed panel includes importing one of an FEA mesh or a surface scan of a manufactured panel.

8. The method of claim 7, wherein the outputting to the computer readable format includes outputting to one of a display, a computer, a printable log, and a storage medium.

9. The method of claim 8, wherein the reference panel includes a second reference patch and the processed panel includes a second processed patch, further comprising:
    viewing the second reference patch and the second processed patch from the first viewpoint with respect to the first simulated light pattern;
    comparing a second reference reflection at the second reference patch with a second processed reflection at the second processed patch;
    creating a second index value from optical variations between the second reference reflection and the second processed reflection; and
    outputting the second index value in a computer readable format.

10. A method to detect and rank appearance distortions, comprising:
    creating a virtual model of a reference panel, wherein the reference panel includes a first reference patch and second reference patch;
    creating a virtual model of a processed panel, wherein the processed panel includes a first processed patch and a second processed patch;
    projecting a first simulated light pattern on the reference panel and the processed panel;
    viewing the first reference patch and the first processed patch from a first viewpoint with respect to the first simulated light pattern;

viewing the second reference patch and the second processed patch from the first viewpoint with respect to the first simulated light pattern;

comparing a first reference reflection at the first reference patch with a first processed reflection at the first processed patch;

comparing a second reference reflection at the second reference patch with a second processed reflection at the second processed patch;

creating a first index value from optical variations between the first reference reflection and the first processed reflection;

creating a second index value from variations between the second reference reflection and the second processed reflection; and outputting the first index value and the second index value in a computer readable format.

11. The method of claim 10, further comprising:

comparing the first index value and the second index value to a predetermined index value; and determining whether the processed panel is within an acceptable appearance quality threshold from the comparison of the first and second index values to the predetermined index value.

12. The method of claim 11, wherein the creating the virtual model of the processed panel includes importing one of an FEA mesh or a surface scan of a manufactured panel.

13. The method of claim 12, wherein the creating the virtual model of the reference panel includes importing one of a CAD surface, an FEA mesh, a surface scan of a die surface, and a surface scan of a clay model.

14. The method of claim 13, further characterized by a lack of generating a dimensional variance between the reference panel and the processed panel.

15. The method of claim 14, further including projecting a second simulated light pattern on the reference panel and the processed panel, wherein the second simulated light pattern is different from the first simulated light pattern.

16. The method of claim 15, further including viewing the first reference patch and the first processed patch from a second viewpoint with respect to the first simulated light pattern, wherein the second viewpoint is different from the first viewpoint.

* * * * *